(12) United States Patent
Kokubo (10) Patent No.: US 11,790,828 B2
(45) Date of Patent: Oct. 17, 2023

(54) CONTROL METHOD FOR DISPLAY APPARATUS, DISPLAY APPARATUS, AND DISPLAY SYSTEM

(71) Applicant: SEIKO EPSON CORPORATION, Tokyo (JP)

(72) Inventor: Koya Kokubo, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/470,013

(22) Filed: Sep. 9, 2021

(65) Prior Publication Data

US 2022/0076613 A1    Mar. 10, 2022

(30) Foreign Application Priority Data

Sep. 9, 2020  (JP) .................................. 2020-151073

(51) Int. Cl.
*G09G 3/20* (2006.01)
*G06F 3/14* (2006.01)

(52) U.S. Cl.
CPC ......... *G09G 3/2096* (2013.01); *G06F 3/1454* (2013.01); *G09G 2370/04* (2013.01); *G09G 2370/06* (2013.01); *G09G 2370/16* (2013.01); *G09G 2370/20* (2013.01)

(58) Field of Classification Search
CPC ............. G09G 3/2096; G09G 2370/04; G09G 2370/06; G09G 2370/16; G09G 2370/20; G06F 3/1454
See application file for complete search history.

(56) References Cited

U.S. PATENT DOCUMENTS

| | | | | |
|---|---|---|---|---|
| 6,473,088 B1* | 10/2002 | Matsumoto | ............ | G09G 5/363 |
| | | | | 345/530 |
| 2004/0130568 A1* | 7/2004 | Nagano | .............. | H04N 21/4312 |
| | | | | 348/E7.083 |
| 2010/0302130 A1* | 12/2010 | Kikuchi | ............. | H04N 21/4316 |
| | | | | 345/1.3 |
| 2016/0062726 A1* | 3/2016 | Takamura | ............. | G06F 3/1454 |
| | | | | 345/2.2 |

FOREIGN PATENT DOCUMENTS

| | | |
|---|---|---|
| JP | 2004-054134 A | 2/2004 |
| JP | 2010-096973 A | 4/2010 |
| JP | 2017-208816 A | 11/2017 |

* cited by examiner

*Primary Examiner* — Brent D Castiaux
(74) *Attorney, Agent, or Firm* — Dority & Manning, P.A.

(57) ABSTRACT

A control method for a display apparatus includes receiving a first control signal transmitted from a first terminal and a second control signal transmitted from a second terminal, storing priority information in which data showing that the second control signal has lower priority than the first control signal is recorded, and, when processing by the first control signal and processing by the second control signal are incompatible with each other, preferentially executing the processing by the first control signal according to the priority information.

7 Claims, 7 Drawing Sheets

| IDENTIFIER | ORDER OF CONNECTION | PRIORITY |
|---|---|---|
| ID1 | 1 | 1 |
| ID2 | 2 | 2 |
| ID3 | 3 | 3 |

FIG. 4

| PROCESSING | MAXIMUM NUMBER |
|---|---|
| ENLARGED DISPLAY | 1 |
| SOUND REPRODUCTION | 1 |
| REPRODUCTION OPERATION | 3 |

CONTROL METHOD FOR DISPLAY APPARATUS, DISPLAY APPARATUS, AND DISPLAY SYSTEM

The present application is based on, and claims priority from JP Application Serial Number 2020-151073, filed Sep. 9, 2020, the disclosure of which is hereby incorporated by reference herein in its entirety.

BACKGROUND

1. Technical Field

The present disclosure relates to a control method for a display apparatus, a display apparatus, and a display system.

2. Related Art

JP-A-2017-208816 discloses a picture display apparatus that transmits and receives device information between a portable terminal and itself by proximity communication, directly connects to the portable terminal by a wireless transmission system different from the proximity communication not via a relay station, and thereby, displays a picture input from the portable terminal.

However, the technique disclosed in JP-A-2017-208816 is to transmit a switching command from another PC to the display apparatus for switching pictures input from a plurality of portable terminals, and processing for transmitting commands from the respective portable terminals to the display apparatus is unclear.

SUMMARY

An aspect of the present disclosure is directed to a control method for a display apparatus including receiving a first control signal transmitted from a first terminal and a second control signal transmitted from a second terminal, storing priority information in which data showing that the second control signal has lower priority than the first control signal is recorded, and, when processing by the first control signal and processing by the second control signal are incompatible with each other, preferentially executing the processing by the first control signal according to the priority information.

Another aspect of the present disclosure is directed to a display apparatus including a communication circuit receiving a first control signal transmitted from a first terminal and a second control signal transmitted from a second terminal, a memory device storing priority information in which data showing that the second control signal has lower priority than the first control signal is recorded, and, a processing circuit preferentially executing the processing by the first control signal according to the priority information when processing by the first control signal and processing by the second control signal are incompatible with each other.

Another aspect of the present disclosure is directed to a display system including a first terminal, a second terminal, and a display apparatus that displays a first image transmitted from the first terminal and a second image transmitted from the second terminal, and the display apparatus includes a communication circuit receiving a first control signal transmitted from the first terminal and a second control signal transmitted from the second terminal, a memory device storing priority information in which data showing that the second control signal has lower priority than the first control signal is recorded, and, a processing circuit preferentially executing the processing by the first control signal according to the priority information when processing by the first control signal and processing by the second control signal are incompatible with each other.

DESCRIPTION OF EXEMPLARY EMBODIMENTS

As below, embodiments of the present disclosure will be explained with reference to the drawings. In the drawings, the same or similar elements respectively have the same or similar signs, and the overlapping description will be omitted. The following embodiments exemplify a system for implementing the technical idea of the present disclosure and an apparatus and a method used for the system. In the technical idea of the present disclosure, types and configurations of the respective apparatuses, network topology, a series of processing, etc. are not limited to those described as below.

Figure 1:
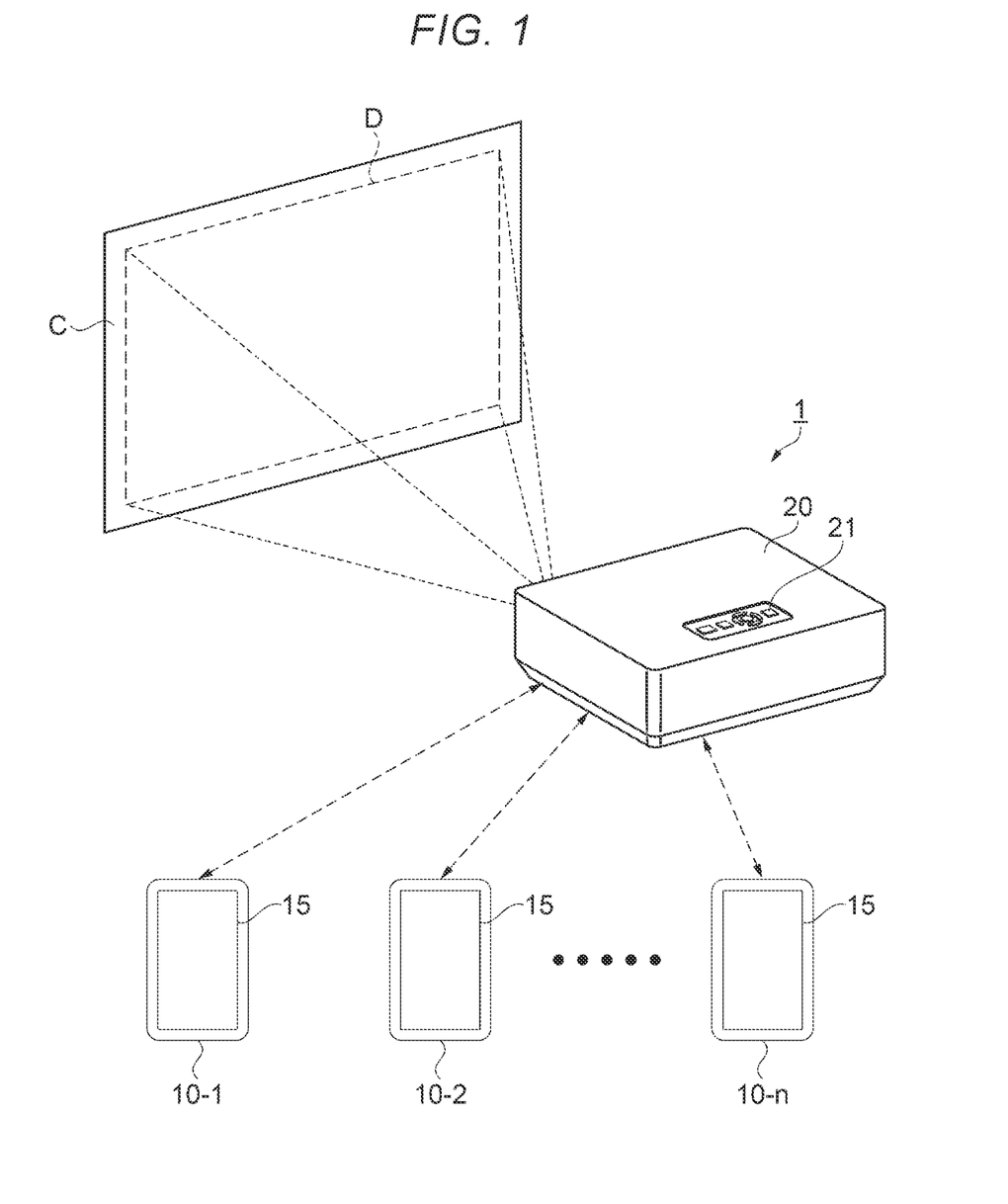
FIG. 1 is a schematic diagram for explanation of a display system according to an embodiment.

As shown in FIG. 1, a display system 1 according to the embodiment includes a plurality of terminals 10-1, 10-2, . . . , 10-n and a display apparatus 20 that displays an image D on a screen C. In FIG. 1, the number of the illustrated plurality of terminals 10-1 to 10-n is three, but the number of the plurality of terminals 10-1 to 10-n may be two, four, or more. That is, n is an integer equal to or larger than 2.

Each of the plurality of terminals 10-1 to 10-n has e.g. a function of transmitting data representing an image to the display apparatus 20. Each of the plurality of terminals 10-1 to 10-n is e.g. a tablet terminal. Each of the plurality of terminals 10-1 to 10-n may be another computer terminal such as a personal computer or a smartphone.

The display apparatus 20 is communicably connected to each of the plurality of terminals 10-1 to 10-n and has a function of displaying the images transmitted from the respective terminals 10-1 to 10-n. The display apparatus 20 is e.g. a projector that displays the image D by projecting light on the screen C. The display apparatus 20 may be another display apparatus such as a flat-panel display.

Figure 2:
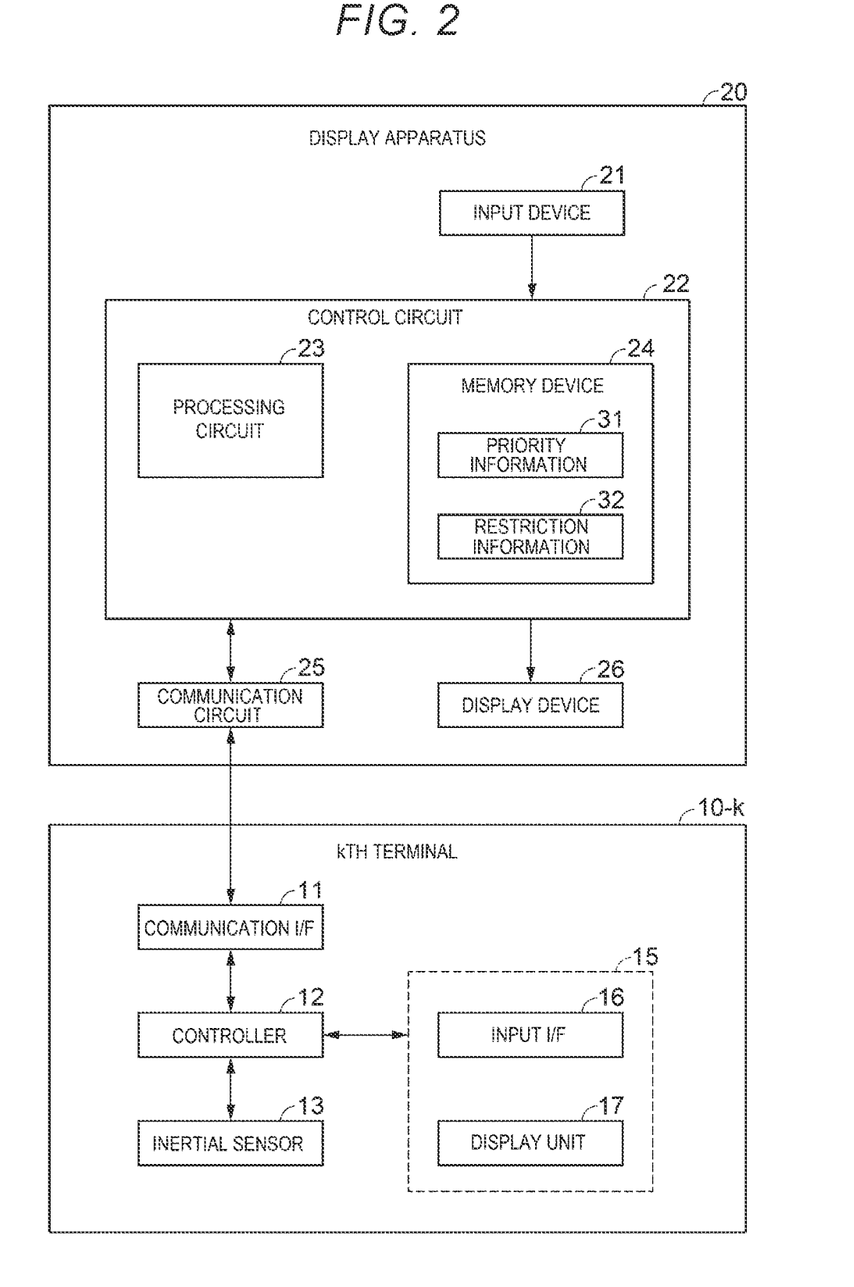
FIG. 2 is a block diagram for explanation of the display system according to the embodiment.

As shown in FIG. 2, the kth terminal 10-k includes e.g. a communication interface (I/F) 11, a controller, an inertial sensor 13, and a touch panel display 15. The kth terminal 10-$k$ is one terminal of the plurality of terminals 10-1 to 10-$n$. That is, k is an integer from 1 to n. In FIG. 2, only the kth terminal 10-$k$ of the plurality of terminals 10-1 to 10-$n$ is shown, and the kth terminal 10-$k$ will be representatively described regarding the plurality of terminals 10-1 to 10-$n$. The description of the other terminals including the first terminal 10-1 and the second terminal 10-2 is equivalent to the description of the kth terminal 10-$k$ (the ordinal number k is replaced by an integer number from 1 to n).

The communication I/F 11 establishes a communication link between the display apparatus 20 and itself according to control by the controller 12 and communicably connects to the display apparatus 20. The communication link may be wired, wireless, or a combination of wired and wireless connection. That is, the communication I/F 11 may be directly connected to the display apparatus 20 or indirectly connected to the display apparatus 20 via another communication device. The communication I/F 11 may include e.g. an antenna that transmits and receives radio signals, a receptacle into which a plug of a communication cable is inserted, a circuit that processes the signal transmitted in the communication link, etc.

The controller 12 has e.g. a processing unit such as a central processing unit (CPU) and a memory medium such as a semiconductor memory. The controller 12 processes calculations necessary for the operation of the kth terminal 10-$k$. For example, the controller 12 realizes various kinds of functions of the kth terminal 10-$k$ described in the embodiment by executing a program stored in the memory medium. The memory medium of the controller 12 stores e.g. a program of a series of processing and various kinds of data necessary for the operation of the kth terminal 10-$k$. The controller 12 may be formed using integrated hardware or separate pieces of hardware.

The inertial sensor 13 detects e.g. accelerations in three axial directions and angular velocities around three axes as inertial data. The controller 12 calculates the attitude of the kth terminal 10-$k$ with respect to the direction of gravitational force based on the inertial data detected by the inertial sensor 13. The controller 12 has a function of changing the orientation and the aspect ratio of the image displayed on the touch panel display 15 according to the attitude of the kth terminal 10-$k$.

The touch panel display 15 includes an input I/F 16 and a display unit 17 formed integrally with each other. The input I/F 16 is a pointing device receiving an operation by a user and outputting a signal in response to the operation by the user to the controller 12. The display unit 17 is a flat-panel display. The input I/F 16 and the display unit 17 may be separate pieces of hardware. In this case, the input I/F 16 may be another input device such as a keyboard or a switch.

The controller 12 of the kth terminal 10-$k$ transmits data representing a kth image to the display apparatus 20 via the communication I/F 11. The kth image is e.g. an image corresponding to the screen of the display unit 17 of the kth terminal 10-$k$. The kth image may be multimedia data reproduced in the kth terminal 10-$k$, computer graphics generated by the controller 12, or the like. The controller 12 of the kth terminal 10-$k$ transmits a kth control signal for instructing control on the output of the display apparatus 20 to the display apparatus 20 via the communication I/F 11. For example, the kth terminal 10-$k$ transmits the kth control signal to the display apparatus 20 according to the operation by the user on the input I/F 16.

The display apparatus 20 includes e.g. an input device 21, a control circuit 22, a communication circuit 25, and a display device 26. The input device 21 receives an operation by the user and outputs a signal in response to the operation by the user to the control circuit 22. As the input device 21, various input devices e.g. a push button, a touch sensor, a pointing device, etc. can be employed.

The control circuit 22 has a processing circuit 23 and a memory device 24. The processing circuit 23 forms a processing unit of a computer that processes calculations necessary for the operation of the display apparatus 20. For example, the processing circuit 23 realizes various kinds of functions of the display apparatus 20 described in the embodiment by executing a control program stored in the memory device 24. As a processing unit forming at least a part of the processing circuit 23, various logical operation circuits e.g. a CPU, a digital signal processor (DSP), a programmable logic device (PLD), application specific integrated circuits (ASIC), etc. can be employed. The processing circuit 23 may be formed using integrated hardware or separate pieces of hardware.

The memory device 24 is a computer-readable memory medium that stores a control program and various data representing a series of processing necessary for the operation of the display apparatus 20. As the memory device 24, e.g. a semiconductor memory can be employed. The memory device 24 is not limited to a nonvolatile auxiliary storage device, but may include a volatile main storage device such as a register or cash memory. At least a part of the memory device 24 may be formed using a part of the processing circuit 23. The memory unit 24 may be formed using integrated hardware or separate pieces of hardware.

The communication circuit 25 receives data representing the kth image transmitted from the kth terminal 10-$k$. Further, the communication circuit 25 receives the kth control signal transmitted from the kth terminal 10-$k$. The communication circuit 25 respectively communicably connects to the plurality of terminals 10-1 to 10-$n$ by establishing communication links between the respective communication I/Fs 11 of the plurality of terminals 10-1 to 10-$n$ and itself according to the control by the processing circuit 23. The communication circuit 25 may include e.g. an antenna that transmits and receives radio signals, a receptacle into which a plug of a communication cable is inserted, a circuit that processes the signals transmitted in the communication links, etc.

The display device 26 includes e.g. a light source, a display element such as a liquid crystal panel having a plurality of pixels, and an optical system including a lens and a mirror. The display element modulates light emitted from the light source according to a drive signal representing an image input from the processing circuit 23. The display device 26 displays the kth image as the image D on the screen C by projecting the light through the display element on the screen C using the optical system according to the control by the processing circuit 23. In addition, the display apparatus 20 may include an output I/F that reproduces sound data contained in the multimedia data transmitted from the kth terminal 10-$k$.

Figure 3:
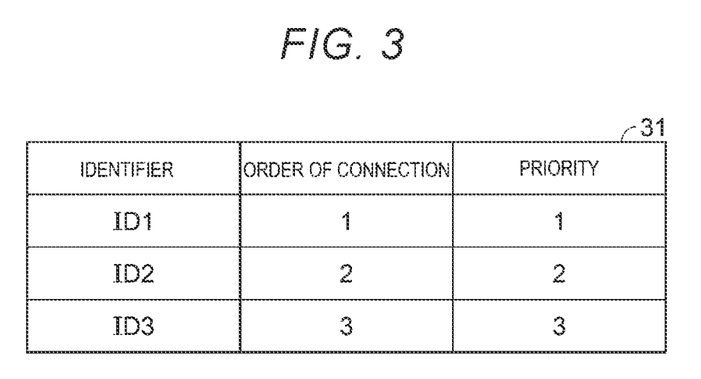
FIG. 3 is a table for explanation of an example of priority information.

As shown in FIG. 3, the memory device 24 stores an identifier for identification of the kth control signal of the kth terminal 10-$k$ and priority information 31 in which priority corresponding to the identifier is recorded. For example, in the example shown in FIG. 3, an ID1 for identification of a first control signal of the first terminal 10-1, an ID2 for identification of a second control signal of the second terminal 10-2, and an ID3 for identification of a third control signal of the third terminal 10-3 are recorded as the respective identifiers in the priority information 31. The identifier is information for identification of the kth control signal by the display apparatus 20. As the identifier, various kinds of information including e.g. an IP address and a MAC address contained in each kth control signal can be employed.

When the communication circuit 25 receives the kth control signal from the kth terminal 10-*k*, the processing circuit 23 retrieves the priority corresponding to the identifier of the kth control signal with reference to the priority information 31. For example, when the first control signal is received from the first terminal 10-1, the processing circuit 23 searches for the ID1 as the identifier of the first control signal from the priority information 31 and retrieves "1" as the priority corresponding to the ID1. In the example shown in FIG. 3, "2" is recorded as the priority corresponding to the ID2 and "3" is recorded as the priority corresponding to the ID3, and the smaller the number of the priority, the higher the priority.

For example, the processing circuit 23 determines the priority of the kth terminal 10-*k* corresponding to the order of connection of the plurality of terminals 10-1 to 10-*n* to the display apparatus 20. In this case, the priority information 31 is appropriately updated by the processing circuit 23 in response to the connection of the kth terminal 10-*k* to the communication circuit 25. That is, the processing circuit 23 records data showing that the second control signal has the lower priority than the first control signal in the priority information 31 because the second terminal 10-2 is connected to the display apparatus 20 after the first terminal 10-1.

Further, the processing circuit 23 records data showing that the third control signal transmitted from the third terminal 10-3 has the lower priority than the second control signal in the priority information 31 because the third terminal 10-3 is connected to the display apparatus 20 after the second terminal 10-2. In this manner, the processing circuit 23 records the lowest priority of the terminals already connected to the display apparatus 20 for the kth control signal of the kth terminal 10-*k* in response to new connection of the kth terminal 10-*k* to the display apparatus 20.

Figure 4:
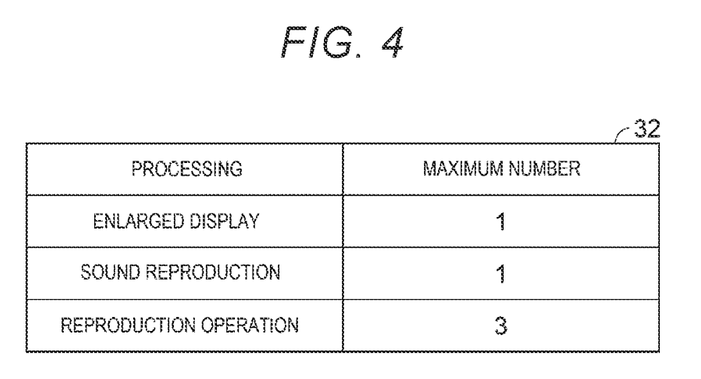
FIG. 4 is a table for explanation of an example of restriction information.

As shown in FIG. 4, the memory device 24 stores restriction information 32 in which the maximum number of pieces of the same kind of processing simultaneously executed in the display apparatus 20 is recorded. In the example shown in FIG. 4, examples of the same kind of processing include enlarged display, sound reproduction, and reproduction operation. As the maximum number of images simultaneously enlarged and displayed on the display apparatus 20, "1" is recorded in the restriction information 32. The maximum number of images corresponds to the maximum number of terminals 10-1 to 10-*n* respectively transmitting images. Similarly, in the restriction information 32, "1" is recorded as the maximum number of terminals 10-1 to 10-*n* inputting sound simultaneously reproduced in the display apparatus 20 and "3" is recorded as the maximum number of terminals 10-1 to 10-*n* for which operation on the data reproduced in the display apparatus 20 is allowed.

Figure 5:
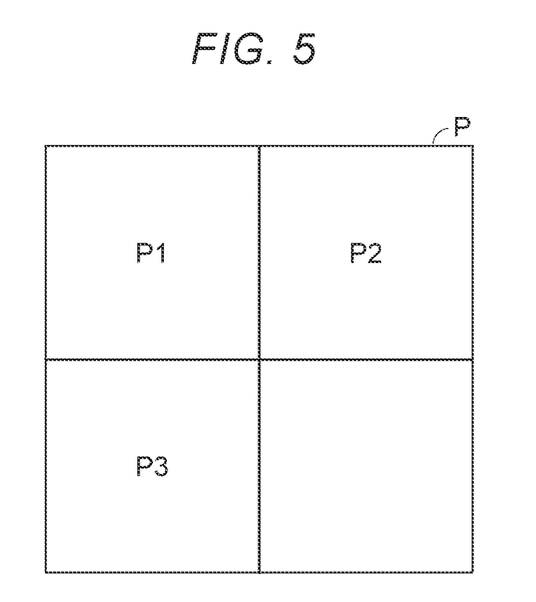
FIG. 5 is a diagram for explanation of an example of a view window.

For example, as shown in FIG. 5, the display apparatus 20 displays a view window P containing a first image P1 transmitted from the first terminal 10-1, a second image P2 transmitted from the second terminal 10-2, and a third image P3 transmitted from the third terminal 10-3. The view window P is e.g. a preview window of the respective images transmitted from the terminals 10-1 to 10-*n* connected to the display apparatus 20. The images contained in the view window P may be appropriately updated according to the terminals 10-1 to 10-*n* in connection.

Figure 6:
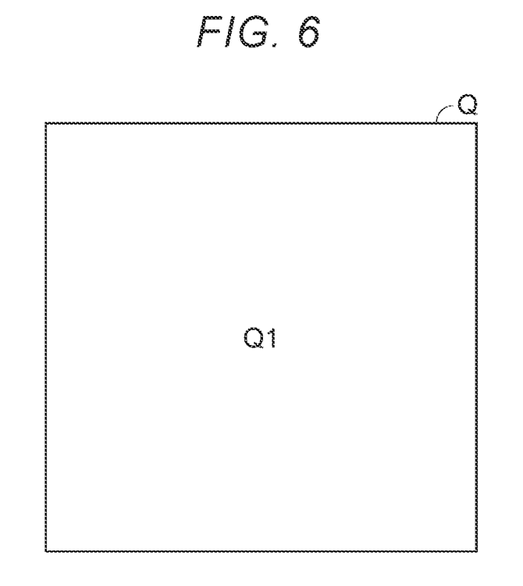
FIG. 6 is a diagram for explanation of an example of an enlargement window.

For example, the communication circuit 25 receives the first control signal for instructing enlarged display of the first image P1 from the first terminal 10-1. In this case, as shown in FIG. 6, the processing circuit 23 displays a first enlarged image Q1 formed by enlarging the first image P1 as an enlargement window Q on the display device 26 according to the first control signal. Similarly, when the display device 26 displays the view window P shown in FIG. 5, the communication circuit 25 receives the second control signal for instructing enlarged display of the second image P2. In this case, as shown in FIG. 7, the processing circuit 23 displays a second enlarged image Q2 formed by enlarging the second image P2 as the enlargement window Q according to the second control signal.

Figure 7:
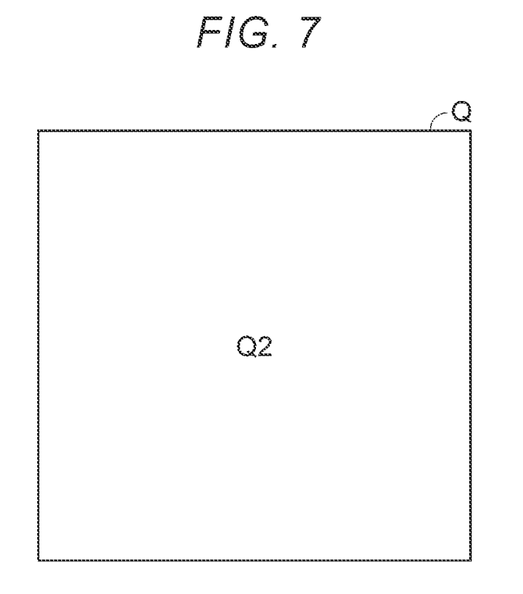
FIG. 7 is a diagram for explanation of another example of the enlargement window.

On the other hand, it is assumed that, when the display apparatus 20 displays the second enlarged image Q2 shown in FIG. 7, the communication circuit 25 receives the first control signal for instructing enlarged display of the first image P1. In this case, the processing circuit 23 selectively enlarges and displays the first image P1 according to the first control signal based on the priority information 31 and the restriction information 32. That is, the processing circuit 23 stops display of the second enlarged image Q2 and displays the first enlarged image Q1 as the enlargement window Q because the maximum number of images simultaneously enlarged and displayed is "1" and the first control signal has the higher priority than the second control signal.

It is assumed that, when the display apparatus 20 displays the first enlarged image Q1 shown in FIG. 6, the communication circuit 25 receives the second control signal for instructing enlarged display of the second image P2. In this case, the processing circuit 23 discards the second control signal and continues display of the first enlarged image Q1 based on the priority information 31 and the restriction information 32. As described above, when the processing by the first control signal and the processing by the second control signal are incompatible with each other, the processing circuit 23 preferentially executes the processing by the first control signal according to the priority information 31.

Figure 8:
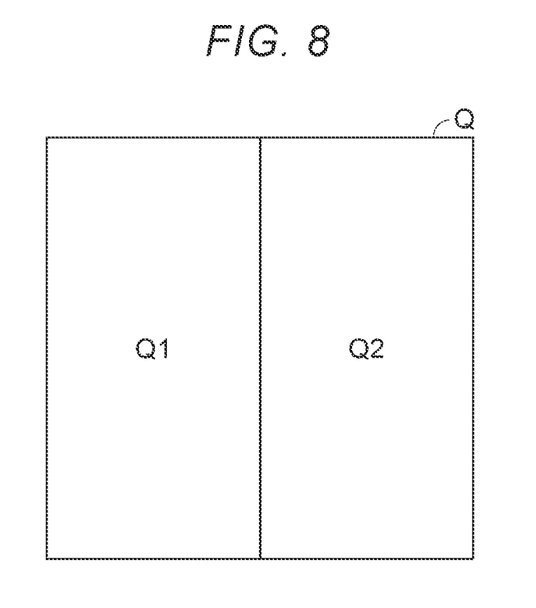
FIG. 8 is a diagram for explanation of another example of the enlargement window.

For example, when "2" is recorded as the maximum number of images simultaneously enlarged and displayed in the restriction information 32 and the display apparatus 20 displays the enlargement window Q shown in FIG. 6, the second control signal for instructing enlarged display of the second image P2 is received. In this case, as shown in FIG. 8, the processing circuit 23 displays the enlargement window Q containing the first enlarged image Q1 and the second enlarged image Q2 according to the second control signal. Further, when "3" is recorded as the maximum number of images simultaneously enlarged and displayed in the restriction information 32 and the display apparatus 20 displays the enlargement window Q shown in FIG. 8, the third control signal for instructing enlarged display of the third image P3 is received. In this case, the processing circuit 23 displays the enlargement window Q containing the first enlarged image Q1, the second enlarged image Q2, and the third enlarged image Q3 according to the third control signal.

Figure 9:
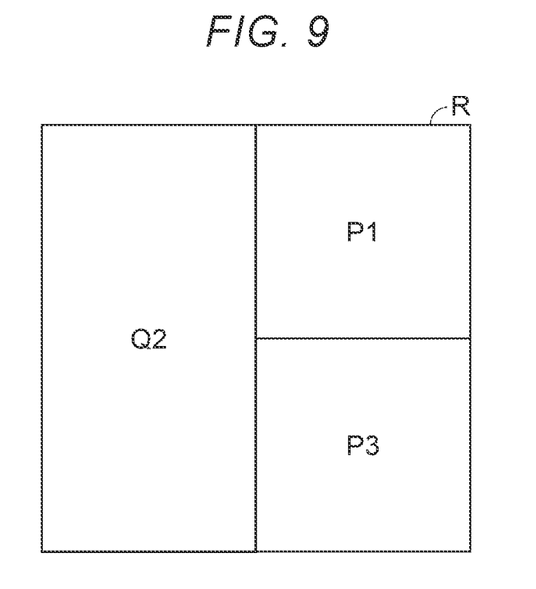
FIG. 9 is a diagram for explanation of an example of a composite window.

As shown in FIG. 9, the processing circuit 23 may display a composite window R corresponding to a combination of the view window P and the enlargement window Q. In the example shown in FIG. 9, the composite window R contains the first image P1, the second enlarged image Q2 and the third image P3. The composite window R may be displayed when the display device 26 displays the view window P shown in FIG. 5 and the communication circuit 25 receives the second control signal for instructing enlarged display of the second image P2. It is assumed that, when the display device 26 displays the composite window R shown in FIG. 9, the communication circuit 25 further receives the second control signal for instructing enlarged display of the second image P2. In this case, the processing circuit 23 may display the second enlarged image Q2 as shown in FIG. 7 as the enlargement window Q on the display device 26.

The processing circuit 23 may change the aspect ratio of the kth image according to the attitude of the kth terminal 10-k. As described above, the aspect ratio of the kth image may be changed in the kth terminal 10-k. For example, when the inertial sensor 13 of the third terminal 10-3 detects the change of the attitude of the third terminal 10-3, the controller 12 of the third terminal 10-3 changes the aspect ratio of the image and the orientation of the image on the touch panel display 15.

Figure 10:
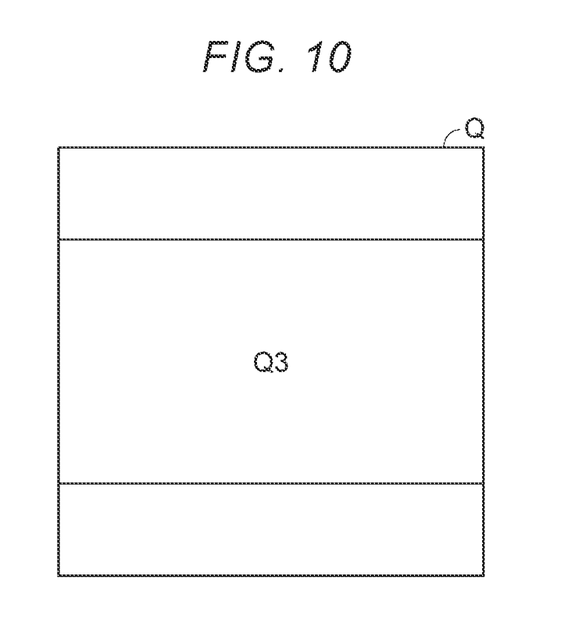
FIG. 10 is a diagram for explanation of another example of the enlargement window.
Figure 11:
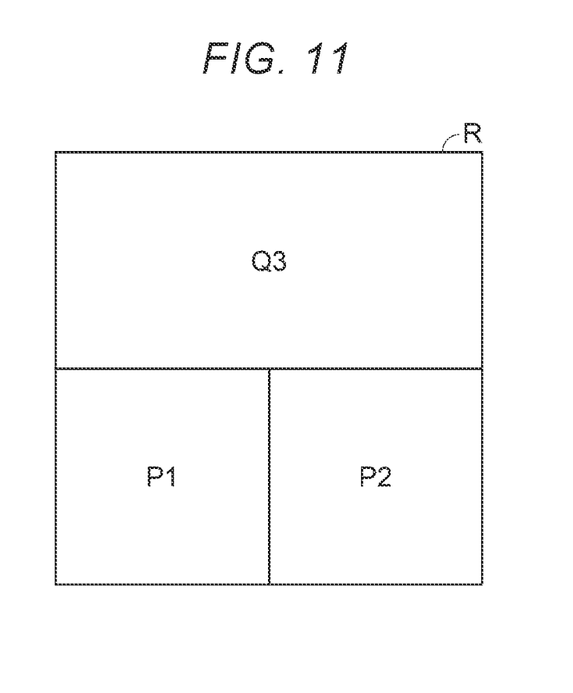
FIG. 11 is a diagram for explanation of another example of the composite window.

In this case, as shown in FIG. 10, the display apparatus 20 may display the landscape-oriented third enlarged image Q3 according to the attitude of the third terminal 10-3 or the aspect ratio of the third image P3. Further, as shown in FIG. 11, when the composite image R containing the first image P1, the second image P2, and the landscape third enlarged image Q3 is displayed, the processing circuit 23 may change the layout to improve use efficiency of the area of the composite image R. The attitude of the third terminal 10-3 is further changed, and thereby, when the landscape third enlarged image Q3 is displayed, the processing circuit 23 may change the layout to a layout for displaying the third enlarged image Q3 like the second enlarged image Q2 in FIG. 9.

Figure 12:
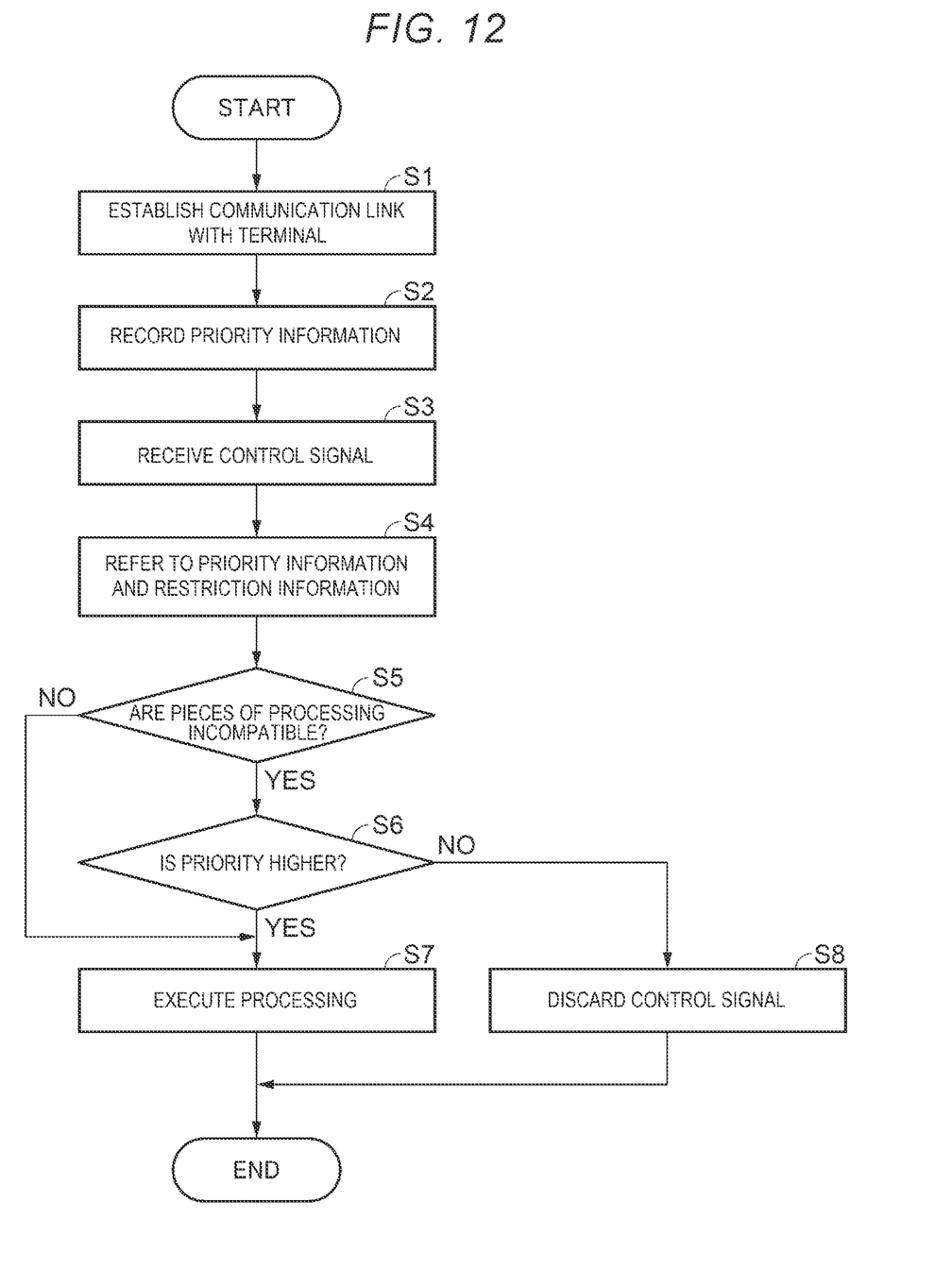
FIG. 12 is a flowchart for explanation of a control method for a display apparatus according to an embodiment.

Referring to a flowchart in FIG. 12, as a control method for the display apparatus 20 according to an embodiment, an example of the operation of the display system 1 will be explained.

First, at step S1, the communication circuit 25 communicably connects to the kth terminal 10-k by establishing the communication link between the kth terminal 10-k and itself according to the control by the processing circuit 23. Specifically, the communication circuit 25 establishes the communication link in cooperation with the communication I/F 11 of the kth terminal 10-k using a predetermined protocol.

At step S2, the processing circuit 23 records the identifier and the priority of the kth control signal of the kth terminal 10-k connected at step S1 in the priority information 31. Specifically, the processing circuit 23 records the lowest priority of the priority already recorded in the priority information 31 for the kth control signal of the kth terminal 10-k.

At step S3, the communication circuit 25 receives the control signal from one of the plurality of terminals 10-1 to 10-n. For example, the communication circuit 25 receives the kth control signal from the kth terminal 10-k.

At step S4, the processing circuit 23 refers to the priority information 31 and the restriction information 32 stored in the memory device 24 based on the kth control signal received at step S3. Specifically, the processing circuit 23 retrieves the priority corresponding to the kth control signal from the priority information 31 and retrieves the maximum number corresponding to the processing instructed by the kth control signal from the restriction information 32.

At step S5, the processing circuit 23 determines whether or not the processing instructed by the kth control signal received at step S3 and processing already in execution by another control signal are incompatible with each other based on the restriction information 32 referred to at step S4. For example, when the maximum number of images simultaneously enlarged and displayed is "1" and the first image P1 is already enlarged and displayed by the first control signal, the display apparatus 20 receives the second control signal for instructing enlarged display of the second image P2. In this case, the processing circuit 23 determines that the processing by the first control signal and the processing by the second control signal of the same kind as the first control signal are incompatible with each other. When determining that the processing is incompatible, the processing circuit 23 moves the processing to step S6 and, when determining that the processing is not incompatible, moves the processing to step S7.

At step S6, the processing circuit 23 determines whether or not the priority of the kth control signal received at step S3 is higher than the priority of the other control signal for instructing the processing already in execution based on the priority information 31 referred to at step S4. When determining that the priority is higher, the processing circuit 23 moves the processing to step S7 and, when determining that the priority is lower, moves the processing to step S8.

At step S7, the processing circuit 23 executes the processing by the kth control signal received at step S3. On the other hand, at step S8, the processing circuit 23 discards the kth control signal received at step S3. In this case, the processing circuit 23 may transmit an error report showing that the kth control signal is discarded and the processing by the kth control signal is not executed to the kth terminal 10-k. The controller 12 of the kth terminal 10-k displays an error message on the display unit 17 in response to the error report, and thereby, the user of the kth terminal 10-k may recognize that the processing by the kth control signal is not executed.

According to the display system 1 of the embodiment, the priority of the respective control signals of the plurality of terminals 10-1 to 10-n is recorded in the priority information 31 and the processing circuit 23 executes the processing by the control signals according to the priority information 31. Accordingly, the same kind of control signals are transmitted from the respective plurality of terminals 10-1 to 10-n and, even when a plurality of pieces of processing are incompatible, the processing to be executed may be appropriately determined. Further, whether or not the pieces of processing are incompatible is determined based on the restriction information 32, and thereby, the processing to be executed may be determined more appropriately. In this manner, a problem due to incompatibility among the pieces of processing may be prevented in the display apparatus 20.

Further, according to the display system 1, the kth control signal for instructing enlarged display may be transmitted from the kth terminal 10-k, and thereby, images enlarged and displayed may be easily switched without need for a complex method using another computer. Furthermore, the priority is automatically determined according to the order of connection of the plurality of terminals 10-1 to 10-n to the display apparatus 20, and thereby, it is unnecessary for the user to determine the priority in advance and the convenience is improved.

The embodiments are described as above, and the present disclosure is not limited to these disclosures. The configurations of the respective parts may be replaced by arbitrary configurations having the same functions, or arbitrary configurations in the respective embodiments may be omitted or added within the technical scope of the present disclosure. From these disclosures, various alternative embodiments will be clear to those skilled in the art.

For example, the priority recorded in the priority information 31 is not necessarily determined according to the order of connection of the plurality of terminals 10-1 to 10-*n* to the display apparatus 20. The priority may be determined according to an order of transmission of the control signals, an order of transmission of the control signals for instructing the same kind of processing, or the like. Alternatively, the priority information 31 may be edited according to the operation on the input device 21 by the user. Further, the processing circuit 23 may have a function of raising the priority of the control signal according to the operation on the touch panel display 15 by the user. For example, the priority of the control signal may be raised according to the number of fingers of the user operating the touch panel display 15 for transmitting the control signal. Alternatively, the priority of the control signal may be changed according to the type of the operation on the touch panel display 15 including tap, swipe, drag, flick, pinch-in, pinch-out or the type of the operation detected by the inertial sensor 13 including shake.

Or, the processing circuit 23 may update or maintain the priority information 31 in response to disconnection between the kth terminal 10-*k* and the display apparatus 20. That is, the processing circuit 23 may delete the record relating to the kth control signal in response to the disconnection of the kth terminal 10-*k*. In this case, for example, when the first terminal 10-1 is connected to the display apparatus 20, then, the second terminal 10-2 is connected to the display apparatus 20, the processing circuit 23 records data showing that the second control signal has the lower priority than the first control signal in the priority information 31. Thereby, the resource usage of the memory device 24 may be saved.

It is obvious that the present disclosure includes various other embodiments including configurations formed by application of the above described respective configurations to one another, though not described as above. The technical scope of the present disclosure is defined only by the matters used to specify the present disclosure according to the appended claims appropriate from the above described explanation.

What is claimed is:

1. A control method for a display apparatus comprising:
   receiving a first control signal transmitted from a first terminal and a second control signal transmitted from a second terminal;
   storing priority information in which data showing that the second control signal has lower priority than the first control signal is recorded;
   when processing by the first control signal and processing by the second control signal are incompatible with each other, preferentially executing the processing by the first control signal according to the priority information;
   storing restriction information in which data showing that the maximum number of pieces of the same kind of processing simultaneously executed is recorded; and
   determining whether or not the processing by the first control signal and the processing by the second control signal are incompatible with each other based on the restriction information.

2. The control method for the display apparatus according to claim 1, wherein
   the first control signal instructs the display apparatus to enlarge and display the first image transmitted from the first terminal,
   the second control signal instructs the display apparatus to enlarge and display a second image transmitted from the second terminal, and
   the maximum number of images simultaneously enlarged and displayed on the display apparatus is recorded in the restriction information.

3. The control method for the display apparatus according to claim 2, wherein
   "1" is recorded as the maximum number of images in the restriction information, and
   the first image according to the first control signal is selectively enlarged and displayed.

4. The control method for the display apparatus according to claim 1, wherein
   when the second terminal is connected to the display apparatus after the first terminal, the data showing that the second control signal has the lower priority than the first control signal is recorded in the priority information.

5. The control method for the display apparatus according to claim 4, wherein
   when a third terminal is connected to the display apparatus after the second terminal, the data showing that a third control signal transmitted from the third terminal has lower priority than the second control signal is recorded in the priority information.

6. A display apparatus comprising:
   a communication circuit configured to receive a first control signal transmitted from a first terminal and a second control signal transmitted from a second terminal;
   a memory device configured to store priority information in which data showing that the second control signal has lower priority than the first control signal is recorded;
   a processing circuit configured to preferentially execute the processing by the first control signal according to the priority information when processing by the first control signal and processing by the second control signal are incompatible with each other;
   wherein the memory device is further configured to store restriction information in which data showing that the maximum number of pieces of the same kind of processing simultaneously executed is recorded; and
   wherein the processing circuit is further configured to determine whether or not the processing by the first control signal and the processing by the second control signal are incompatible with each other based on the restriction information.

7. A display system comprising:
   a first terminal;
   a second terminal; and
   a display apparatus configured to display a first image transmitted from the first terminal and a second image transmitted from the second terminal,
   the display apparatus including
   a communication circuit configured to receive a first control signal transmitted from the first terminal and a second control signal transmitted from the second terminal,
   a memory device configured to store priority information in which data showing that the second control signal has lower priority than the first control signal is recorded,
   a processing circuit configured to preferentially execute the processing by the first control signal according to the priority information when processing by the first control signal and processing by the second control signal are incompatible with each other;

wherein the memory device is further configured to store restriction information in which data showing that the maximum number of pieces of the same kind of processing simultaneously executed is recorded; and wherein the processing circuit is further configured to determine whether or not the processing by the first control signal and the processing by the second control signal are incompatible with each other based on the restriction information.

\* \* \* \* \*